(12) United States Patent
Ohno et al.

(10) Patent No.: US 7,281,317 B2
(45) Date of Patent: Oct. 16, 2007

(54) MANUFACTURING METHOD OF FLYING MAGNETIC HEAD SLIDER

(75) Inventors: Morihiro Ohno, Kwai Chung (HK); Osamu Fukuroi, Kwai Chung (HK); Ryuji Fujii, Kwai Chung (HK)

(73) Assignee: SAE Magnetics (H.K.) Ltd., Kwai Chung, N.T. (HK)

( * ) Notice: Subject to any disclaimer, the term of this patent is extended or adjusted under 35 U.S.C. 154(b) by 289 days.

(21) Appl. No.: 10/885,745

(22) Filed: Jul. 8, 2004

(65) Prior Publication Data
US 2005/0005426 A1 Jan. 13, 2005

(30) Foreign Application Priority Data
Jul. 10, 2003 (JP) .............................. 2003-194915

(51) Int. Cl.
*G11B 5/127* (2006.01)
*H04R 31/00* (2006.01)

(52) U.S. Cl. ................... 29/603.16; 29/417; 29/603.13; 29/603.15; 29/603.18; 216/22; 216/38; 216/41; 360/235.4; 360/234.3; 360/236.5; 360/294.7; 427/127; 427/128; 451/5; 451/41

(58) Field of Classification Search ............. 29/603.11, 29/603.13–603.16, 603.18, 417; 216/22, 216/38, 41; 360/235.4, 234.3, 236.5, 294.7; 427/127, 128; 451/5, 41
See application file for complete search history.

(56) References Cited

U.S. PATENT DOCUMENTS

| | | | | |
|---|---|---|---|---|
| 5,104,483 A | * | 4/1992 | Takeya ........................ | 216/22 |
| 6,301,079 B1 | * | 10/2001 | Hanamoto et al. ....... | 360/236.5 |
| 6,428,715 B1 | | 8/2002 | Abels et al. .................. | 216/22 |

* cited by examiner

*Primary Examiner*—Paul D. Kim
(74) *Attorney, Agent, or Firm*—Oblon, Spivak, McClelland, Maier & Neustadt, P.C.

(57) ABSTRACT

A manufacturing method of a flying magnetic head slider includes a step of providing a substrate with a plurality of inductive write head elements formed thereon, each head element having a pair of magnetic poles facing to each other via a magnetic gap, and with a protection layer covering the plurality of inductive write head elements, a step of cutting the substrate to separate into a plurality of bar members, each of the bar members having aligned inductive write head elements, a step of processing the protection layer of each bar member so that a distance from an end edge of the pair of magnetic poles to an edge of a bottom surface of the bar member becomes in a range of 1 to 15 μm, a step of lapping each bottom surface of the bar member, and cutting each bar member to separate into a plurality of individual magnetic head sliders.

9 Claims, 5 Drawing Sheets

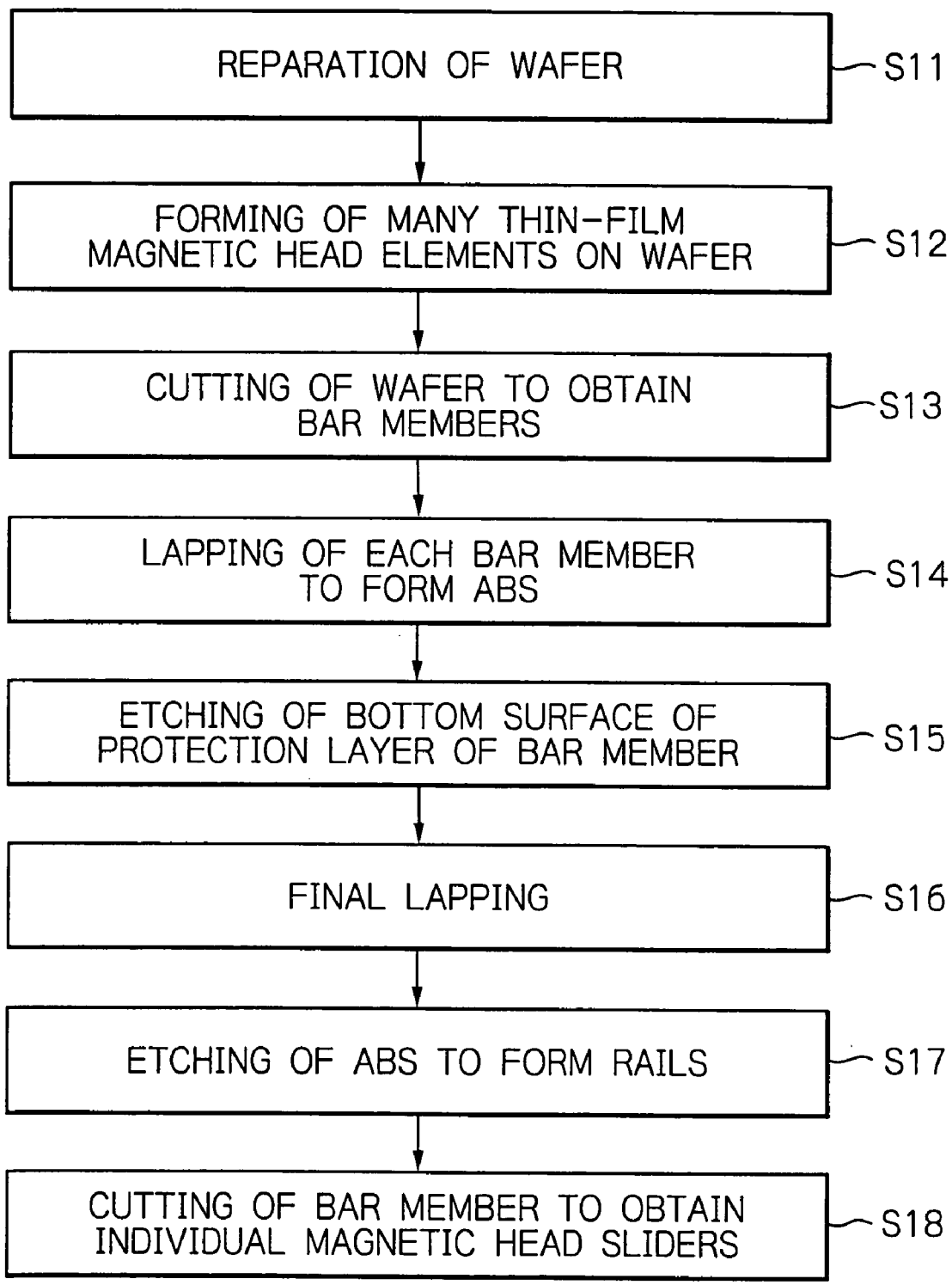

MANUFACTURING METHOD OF FLYING MAGNETIC HEAD SLIDER

PRIORITY CLAIM

This application claims priority from Japanese patent application No.2003-194915, filed on Jul. 10, 2003, which is incorporated herein by reference.

BACKGROUND OF THE INVENTION

1. Field of the Invention

The present invention relates to a manufacturing method of a flying magnetic head slider provided with a thin-film magnetic head element.

2. Description of the Related Art

In a magnetic disk drive device, thin-film magnetic head elements for writing magnetic information into and/or reading magnetic information from magnetic disks are in general formed on magnetic head sliders flying in operation above the rotating magnetic disks. The sliders are supported at top end sections of suspensions, respectively.

Recently, a flying height of the magnetic head slider rapidly lowers to satisfy the requirement for ever increasing data storage capacities and densities in today's magnetic disk drive apparatus. Because of such lowered flying height, a possible protrusion of a protection layer of the slider at a corner portion between an air bearing surface (ABS) and a trailing surface, which corner is the lowest portion of the slider during the flying operations has not become negligible. Particularly, in the magnetic head slider with an inductive write head element, a protection layer may thermally expand and protrude due to the write current causing the protruded portion to come into contact with the magnetic disk surface during operations.

Known is a method of forming a step or recess at a corner edge between the ABS and the trailing surface of the magnetic head slider, by partially removing the protection layer during a patterning process of the ABS, to reduce the protrusion of the protection layer as small amount as possible.

In another known method disclosed for example in U.S. Pat. No. 6,428,715 B1, protrusion of a protection or overcoat layer made of a typical material of alumina ($Al_2O_3$) is reduced by immersing the overcoat layer in an alkaline solution and thus by etching the whole ABS of the overcoat layer to form a step.

However, according to the former known method, due to the limited resolution of a resist and the limited precision in an exposure equipment used for patterning the ABS, it is impossible to bring a starting point of the step close to a magnetic pole of the inductive write head element. Therefore, the protrusion amount cannot be reduced so much. If the step is formed over a part of the magnetic pole, a coating film such as a diamond like carbon (DLC) film is removed causing corrosion of the pole to occur.

According to the latter known method, it is ensured to etch the alumina and to form a step. However, if the magnetic pole contains a metal material easily etched by an alkaline, the pole itself is etched to deteriorate the characteristics of the write head element.

BRIEF SUMMARY OF THE INVENTION

It is therefore an object of the present invention to provide a manufacturing method of a flying magnetic head slider, whereby manufacturing process becomes easy.

Another object of the present invention is to provide a manufacturing method of a flying magnetic head slider, whereby protrusion of a protection layer can be reduced without adversely affecting head element characteristics.

According to the present invention, a manufacturing method of a flying magnetic head slider includes a step of providing a substrate with a plurality of inductive write head elements formed thereon, each head element having a pair of magnetic poles facing to each other via a magnetic gap, and with a protection layer covering the plurality of inductive write head elements, a step of cutting the substrate to separate into a plurality of bar members, each of the bar members having aligned inductive write head elements, a step of processing the protection layer of each bar member so that a distance from an end edge of the pair of magnetic poles to an edge of a bottom surface of the bar member becomes in a range of 1 to 15 µm, a step of lapping each bottom surface of the bar member, and cutting each bar member to separate into a plurality of individual magnetic head sliders.

After shortening the distance from an end edge of the pair of magnetic poles to an edge of the bottom surface of the bar member becomes in a range of 1 to 15 µm, the bottom surface of the bar member is lapped. Thus, the corner edge of the protection layer is rounded off or more shaved. The rounded edge is produced because the outer region of the lapped surface is shaved greater than its inner region depending upon the lapping direction, the lapping pressure and the abrasive plate material. Because the corner edge is formed to have a curved cross sectional profile, the end edge of the bottom surface to be near to the upper magnetic pole of the inductive write head element, so as to back off the surface of the protection layer. Therefore, it is possible to reduce the amount of the thermal expansion protrusion of the protection layer toward the ABS due to write current during writing operations. Particularly, according to the present invention, because the end edge of the bottom surface is inherently rounded by merely performing the lapping, the manufacturing process becomes quite easy. Also, since this method will induce no damage to the magnetic pole, the thermal expansion protrusion of the protection layer can be certainly reduced without deteriorating the characteristics of the magnetic head element.

It is preferred that the processing step includes chamfering a corner edge of the protection layer between a first end surface near which the inductive write head elements are formed and the bottom surface to form a chamfered section so that a distance from the end edge of the pair of magnetic poles to the edge of a bottom surface of the bar member becomes in a range of 1 to 15 µm. Thus, the bottom surface of the bar member is smoothly continued to the chamfered section surface and also the corner edge of the bar member itself is chamfered. Therefore, it is possible to reduce generation of chipping of the corner edge during the manufacturing process after the chamfering and to reduce possibility of a crash of the magnetic head slider with the disk surface to improve the reliability.

It is also preferred that the processing step includes chamfering the corner edge to form the chamfered section with an angle in a range of 20 to 70 degrees with respect to the bottom surface. If the angle is in this range, airflow vortexes formed at the air-outlet of the slider in operation become small and thus contaminations or particles caught therein can be reduced.

It is preferred that the processing step includes etching the bottom surface so that a distance from the end edge of the pair of magnetic poles to the edge of a bottom surface of the bar member becomes in a range of 1 to 15 µm.

It is further preferred that the lapping step includes lapping the bottom surface of the bar member using diamond abrasive grains.

Preferably, the providing step includes providing a substrate with a plurality of magnetoresistive effect (MR) read head elements, with a plurality of inductive write head elements, each inductive write head element having a pair of magnetic poles facing to each other via a magnetic gap, and with a protection layer covering the plurality of MR read head elements and the plurality of inductive write head elements.

According to the present invention, also, a manufacturing method of a flying magnetic head slider includes a step of providing a substrate with a plurality of inductive write head elements formed thereon, each head element having a pair of magnetic poles facing to each other via a magnetic gap, and with a protection layer made of a resist material, covering the plurality of inductive write head elements, the protection layer on an end edge of the pair of magnetic poles having a thickness in a range of 10 to 15 µm, a step of cutting the substrate to separate into a plurality of bar members, each of the bar members having aligned inductive write head elements, a step of etching a bottom surface of each bar member, and a step of cutting each bar member to separate into a plurality of individual magnetic head sliders.

The protection layer made of the resist material is formed to have a thickness in a range of 10 to 15 µm at an end edge of the pair of magnetic poles, and then the bottom surface of the bar member is etched. Thus, the corner edge of the protection layer is rounded off or more shaved. The rounded edge is produced because the outer region of the lapped surface is shaved greater than its inner region depending upon the lapping direction, the lapping pressure and the abrasive plate material. Because the corner edge is formed to have a curved cross sectional profile, the end edge of the bottom surface to be near to the upper magnetic pole of the inductive write head element, so as to back off the surface of the protection layer. Therefore, it is possible to reduce the amount of the thermal expansion protrusion of the protection layer toward the ABS due to write current during writing operations. Particularly, according to the present invention, because the end edge of the bottom surface is inherently rounded by merely performing the lapping, the manufacturing process becomes quite easy. Also, since this method will induce no damage to the magnetic pole, the thermal expansion protrusion of the protection layer can be certainly reduced without deteriorating the characteristics of the magnetic head element.

It is preferred that the etching step includes ion-milling the bottom surface of the bar member.

Preferably, the providing step includes providing a substrate with a plurality of MR read head elements, with a plurality of inductive write head elements, each inductive write head element having a pair of magnetic poles facing to each other via a magnetic gap, and with a protection layer covering the plurality of MR read head elements and the plurality of inductive write head elements.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 5 is a flow chart illustrating a part of a manufacturing process of a magnetic head slider in another embodiment according to the present invention.

DETAILED DESCRIPTION OF THE INVENTION

Figure 1:
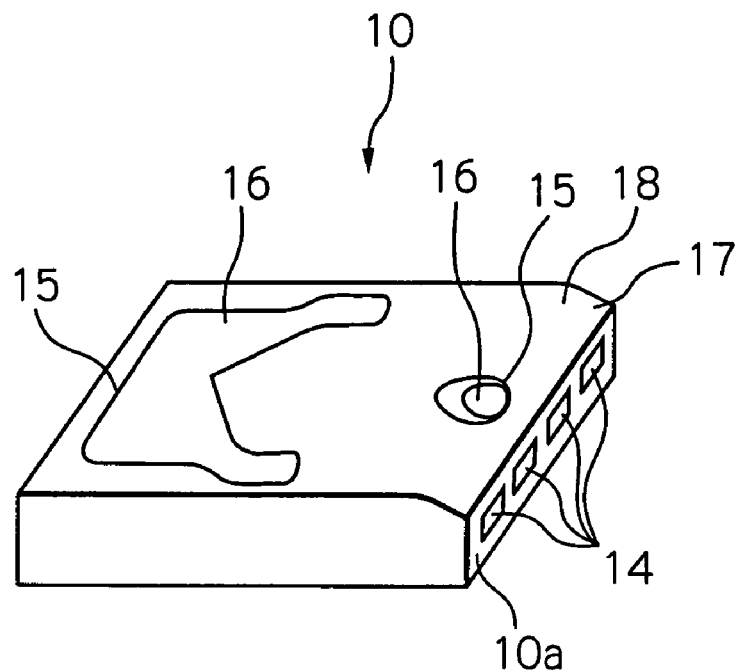
FIG. 1 is an oblique view illustrating a flying magnetic head slider as a preferred embodiment according to the present invention.
Figure 2:
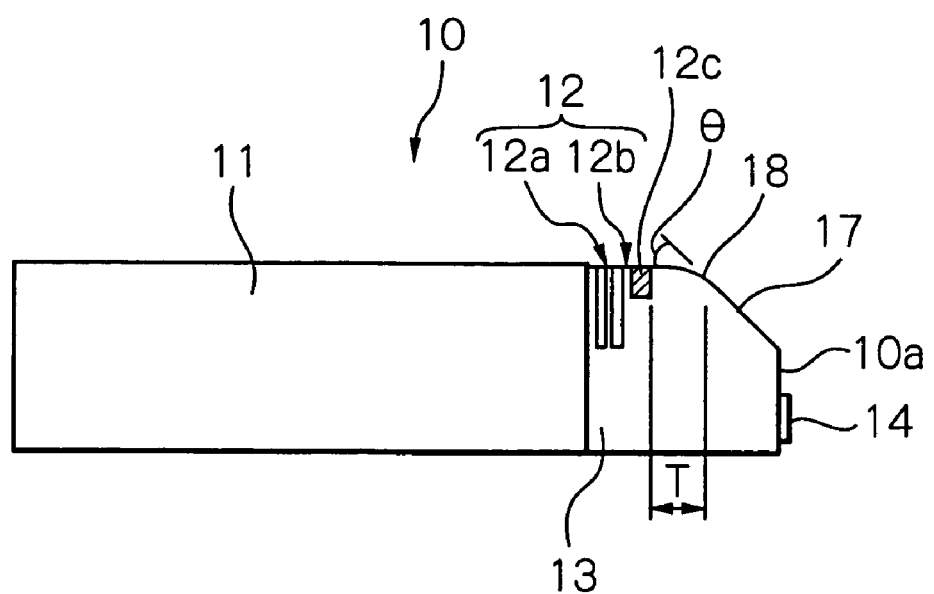
FIG. 2 is an axial section view illustrating the magnetic head slider of the embodiment shown in FIG. 1.

FIG. 1 illustrates a flying magnetic head slider as a preferred embodiment according to the present invention, and FIG. 2 illustrates an axial section of the magnetic head slider of this embodiment.

As shown in these figures, a magnetic head slider 10 substantially consists of a substrate section 11 made of for example $Al_2O_3$-TiC, thin-film magnetic head elements 12 such as a magnetoresistive effect read head element 12a and an inductive write head element 12b formed on a rear surface (element formed surface) of the substrate section 11, a protection layer 13 made of for example alumina ($Al_2O_3$) for covering the magnetic head elements 12, terminal electrodes 14 electrically connected to the magnetic head elements 12, exposed from the protection layer 13, a plurality of rails 15 formed on a bottom surface of the substrate section 11, and ABSs 16 formed on the respective rails 15.

In this embodiment, a corner edge between a trailing surface 10a and the bottom surface of the slider is chamfered to form a chamfered section 17. A corner edge 18 between this chamfered section 17 and the bottom surface is rounded by lapping to have a curved cross sectional profile. A distance T between the corner edge 18 before rounding namely just after chamfering and an upper end edge of an upper magnetic pole 12c of the inductive write head element is desirably determined in a range of 1-15 µm.

It is desired that an angle θ of a surface of the chamfered section 17 with respect to the bottom surface be in a range of 20-70 degrees. If this angle between the chamfered section surface and the bottom surface is too small, edge control in the chamfering becomes difficult. Whereas if the angle is too large, the magnetic pole, yoke and also coil of the inductive write head element 12b may be removed. When the angle is in this range, airflow vortexes formed at the air-outlet of the slider in operation become small and thus contaminations or particles caught therein can be reduced. The surface of the chamfered section 17 is not necessary to be completely flat but some surface asperities may be permitted. If there are surface asperities, an average angle between the surface of the chamfered section 17 and the bottom surface should be in the above-mentioned range.

Figure 3:
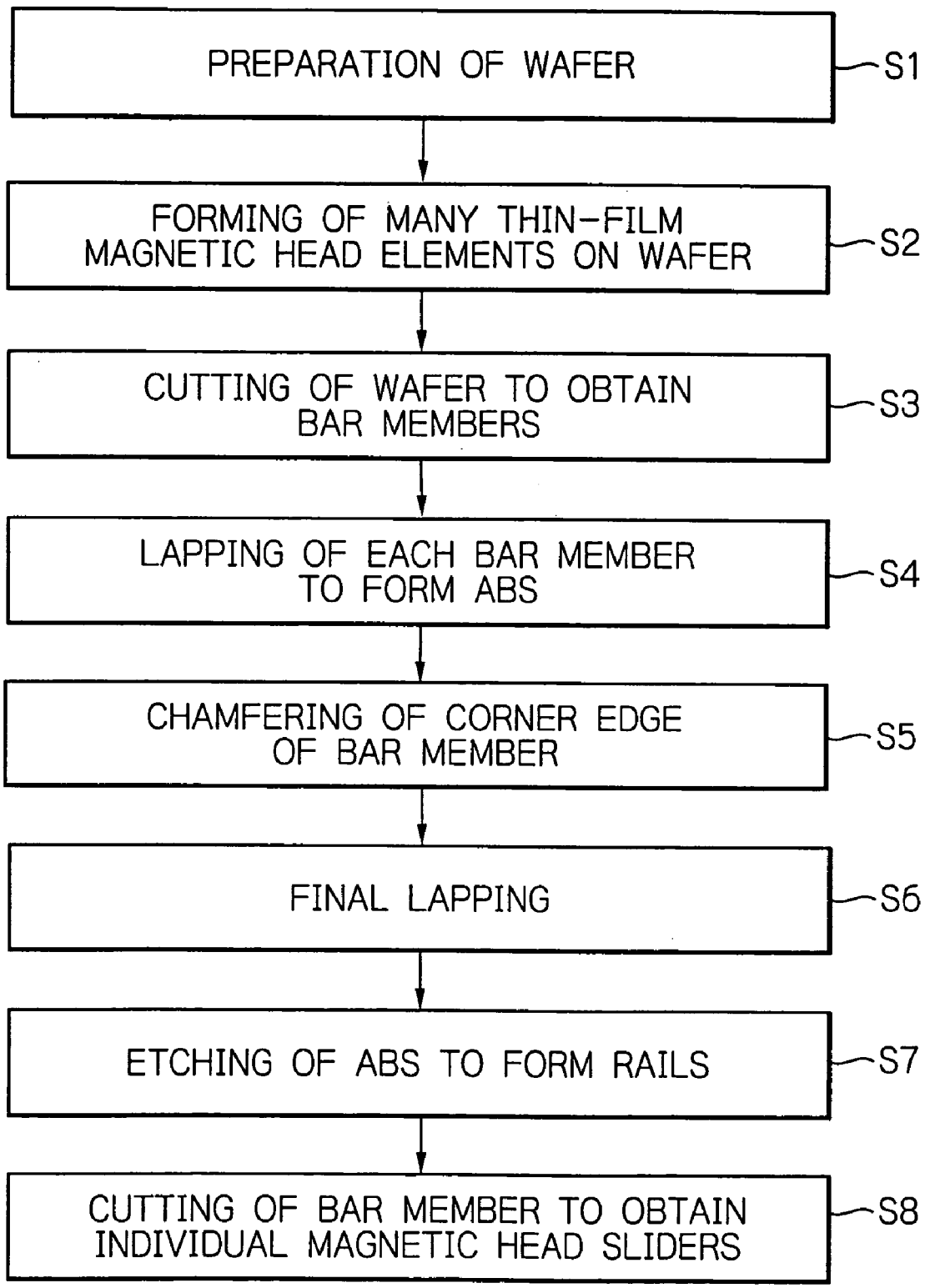
FIG. 3 is a flow chart illustrating a part of a manufacturing process of the magnetic head slider of the embodiment shown in FIG. 1.
Figure 4A:
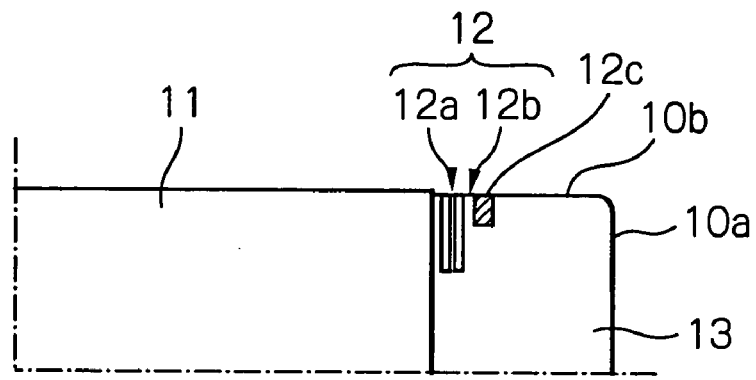
FIGS. 4a, 4b and 4c are enlarged axial section views illustrating corner edges between trailing surfaces and ABSs of the bar member in the respective processes in the embodiment shown in FIG. 1.
Figure 4B:
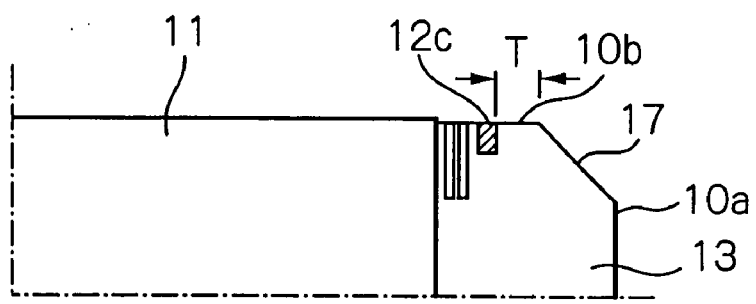
Figure 4C:
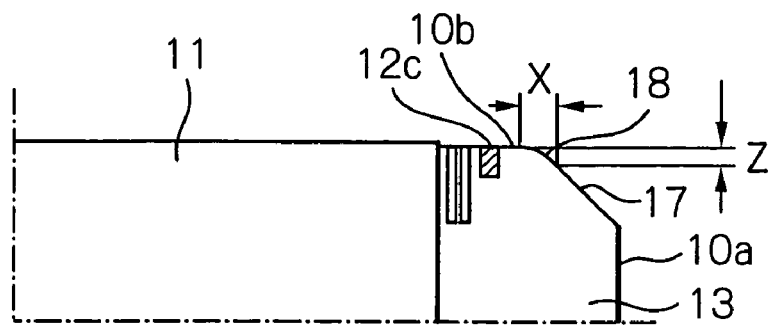

FIG. 3 illustrates a part of a manufacturing process of the magnetic head slider of this embodiment, and FIGS. 4a, 4b and 4c illustrate enlarged axial section of corner edge portions between trailing surfaces and bottom surfaces of the magnetic head slider in the respective processes in this embodiment. Hereinafter, the manufacturing method of the magnetic head slider of this embodiment will be described using this drawing as reference.

First, a wafer or substrate made of $Al_2O_3$-TiC for example is prepared (Step S1).

Then, many thin-film magnetic head elements consisting of MR read head elements and inductive write head elements, many terminal electrodes for the respective thin-film magnetic head elements, and a protection layer are formed on the wafer by using a known thin-film integration technique (Step S2). Thus, a wafer with a thin-film surface layer of the magnetic head elements and the protection layer made of for example alumina ($Al_2O_3$) for over-coating the magnetic head elements is obtained.

Then, the wafer is cut to separate into a plurality of bar members each of which has a plurality of aligned magnetic head elements (Step S3).

Then, a bottom surface of each bar member, which surface will configure ABSs is lapped to adjust an MR height and to form the ABSs (Step S4). FIG. 4a illustrates a corner edge portion between a top surface that will configure the trailing surface 10a of the magnetic head slider and the bottom surface or ABS side surface of the bar member in this state.

Then, the protection layer 17 at a corner edge between the bottom surface 10b and the top surface 10a of each bar member, which top surface will configure the trailing surface of each magnetic head slider is chamfered to form a chamfered surface 17 (Step S5). FIG. 4b illustrates the corner edge portion of the bar member in this state.

This chamfering may be performed by lapping, grinding, dry etching or chemical etching. In this case, a distance T between the corner edge and the upper end edge of the upper magnetic pole of the inductive write head element is determined in a range of 1-15 µm. Also, the chamfering should be executed so that an angle θ of the chamfered section surface 17 with respect to the bottom surface becomes in a range of 20-70 degrees. If this angle between the chamfered section surface and the bottom surface is too small, edge control in the chamfering becomes difficult. Whereas if the angle is too large, the magnetic pole, yoke and also coil of the inductive write head element 12b may be removed. When the angle is in this range, airflow vortexes formed at the air-outlet of the slider in operation become small and thus contaminations or particles caught therein can be reduced. The chamfered section surface is not necessary to be completely flat but some surface asperities may be permitted. If there are surface asperities, an average angle between the chamfered section surface and the bottom surface should be in the above-mentioned range.

Then, the bottom surface 10b of each bar member, which surface will configure the ABSs, is finally lapped (Step S6) by using diamond abrasive grain. In general, when the bottom surface is finally lapped, the corner edge 18 of the protection layer 13 will be rounded off or more shaved. The rounded edge is produced because the outer region of the lapped surface is shaved greater than its inner region depending upon the lapping direction, the lapping pressure and the abrasive plate material. A depth Z and a width X of the rounded edge of an alumina layer are Z=1.53 nm and X=5-12 µm, when the alumina layer surface is lapped using diamond abrasive grains with a nominal diameter of ⅒ µm and a tin lapping plate under conditions of an applied load of 2.6 kg/cm³ and a lapping plate rotating speed of 2 rpm.

FIG. 4c illustrates the corner edge portion of the bar member in this state. As will be apparent from the figure, by performing the final lapping, a corner edge portion 18 with a curved cross sectional profile is formed. This causes the end edge of the bottom surface 10b to be near to the upper magnetic pole 12c of the inductive write head element 12b, so as to back off the surface of the protection layer 13. Therefore, it is possible to reduce the amount of the thermal expansion protrusion of the protection layer 13 toward the ABS due to write current during writing operations. Particularly, according to this method, because the end edge of the bottom surface is inherently rounded by merely performing the final lapping, the manufacturing process becomes quite easy. Also, since this method will induce no damage to the magnetic pole, the thermal expansion protrusion of the protection layer can be certainly reduced without deteriorating the characteristics of the magnetic head element.

Thereafter, the bottom surfaces of the plurality of bar members are etched by ion milling for example to form a rail pattern (Step S7).

Then, each bar member is cut to separate into individual magnetic head sliders (Step S8).

Actually, bar member samples were fabricated. Namely, in chamfering process at Step S5, the corner edge between the bottom surface and the top surface of the bar member sample was chamfered to form a chamfered surface with an angle θ of 45 degrees with respect to the bottom surface and with a distance T of 15 µm between the corner edge 18 and the upper end edge of the upper magnetic pole 12c of the inductive write head element. Then, in final lapping process at Step S6, the bottom surface of the bar member sample provided with the chamfered section was lapped. After the final lapping, a first depth at the corner edge 18 from the ABS level and a second depth (pole tip recess, PTR) at the top of the upper pole 12c from the ABS level were measured. The measured first and second depths were 4.3 nm and 2.1 nm, respectively. Corresponding depths in a bar member sample with no chamfered surface but only the final lapping being performed were 1.8 nm and 2.2 nm, respectively. Therefore, it was confirmed that according to the manufacturing process of this embodiment the protection layer 13 only at a region having a little effect on the performance of the magnetic head element can be dented about 2 nm without inducing any damage on the PTR that will exert a great influence upon the actual characteristics of the magnetic head element.

Then, thus fabricated magnetic head slider was mounted on a magnetic disk drive apparatus and a probability of contact of the magnetic head slider with the rotating magnetic disk surface when a write current was flowing through the inductive write head element was measured. The measured probability of the magnetic head slider according to this embodiment was about half of that of the conventional magnetic head slider.

In addition, according to the embodiment, because the chamfered section 17 is formed at the corner edge between the bottom surface and the trailing surface 10a of the magnetic head slider, there is no place for catching contaminations or particles near this edge and thus it is possible to prevent depositions of contaminations and unnecessary particles. Also, the chamfered corner edge of the magnetic head slider will reduce generation of chipping of the corner edge during the manufacturing process after the chamfering and will reduce possibility of a crash of the head slider with the disk surface to improve the reliability.

FIG. 5 illustrates a part of a manufacturing process of the magnetic head slider as another embodiment according to the present invention. In this embodiment, a thickness in a partial area of a protection layer between an upper end edge of an upper magnetic pole and a corner edge between a bottom surface and a top surface of a bar member is adjusted in a range of 1-15 μm without performing chamfering. Hereinafter, the manufacturing method of the magnetic head slider of this embodiment will be described using this drawing as reference.

First, a wafer or substrate made of $Al_2O_3$-TiC for example is prepared (Step S11).

Then, many thin-film magnetic head elements consisting of MR read head elements and inductive write head elements, many terminal electrodes for the respective thin-film magnetic head elements, and a protection layer are formed on the wafer by using a known thin-film integration technique (Step S12). Thus, a wafer with a thin-film surface layer of the magnetic head elements and the protection layer made of for example alumina ($Al_2O_3$) for over-coating the magnetic head elements is obtained.

Then, the wafer is cut to separate into a plurality of bar members each of which has a plurality of aligned magnetic head elements (Step S13).

Then, a bottom surface of each bar member, which surface will configure ABSs, is lapped to adjust an MR height and to form the ABSs (Step S14).

Then, the bottom surface of the protection layer of each bar member is etched by dry etching or wet etching to adjust the thickness in a partial area of the protection layer so that the distance T from the upper end edge of the upper magnetic pole to the corner edge between the bottom surface and the top surface of the bar member is in a range of 1-15 μm (Step S15).

Then, the bottom surface of each bar member, which surface will configure the ABSs, is finally lapped (Step S16) by using diamond abrasive grain. In general, when the bottom surface is finally lapped, the corner edge of the protection layer will be rounded off or more shaved. The rounded edge is produced because the outer region of the lapped surface is shaved greater than its inner region depending upon the lapping direction, the lapping pressure and the abrasive plate material.

By performing the final lapping, a corner edge portion with a curved cross sectional profile is formed. This causes the end edge of the bottom surface to be near to the upper magnetic pole of the inductive write head element, so as to back off the surface of the protection layer. Therefore, it is possible to reduce the amount of the thermal expansion protrusion of the protection layer toward the ABS due to write current during writing operations. Particularly, according to this method, because the end edge of the bottom surface is inherently rounded by merely performing the final lapping, the manufacturing process becomes quite easy. Also, since this method will induce no damage to the magnetic pole, the thermal expansion protrusion of the protection layer can be certainly reduced without deteriorating the characteristics of the magnetic head element.

Thereafter, the bottom surfaces of the plurality of bar members are etched by ion milling for example to form a rail pattern (Step S17).

Then, each bar member is cut to separate into individual magnetic head sliders (Step S18).

Figure 6:
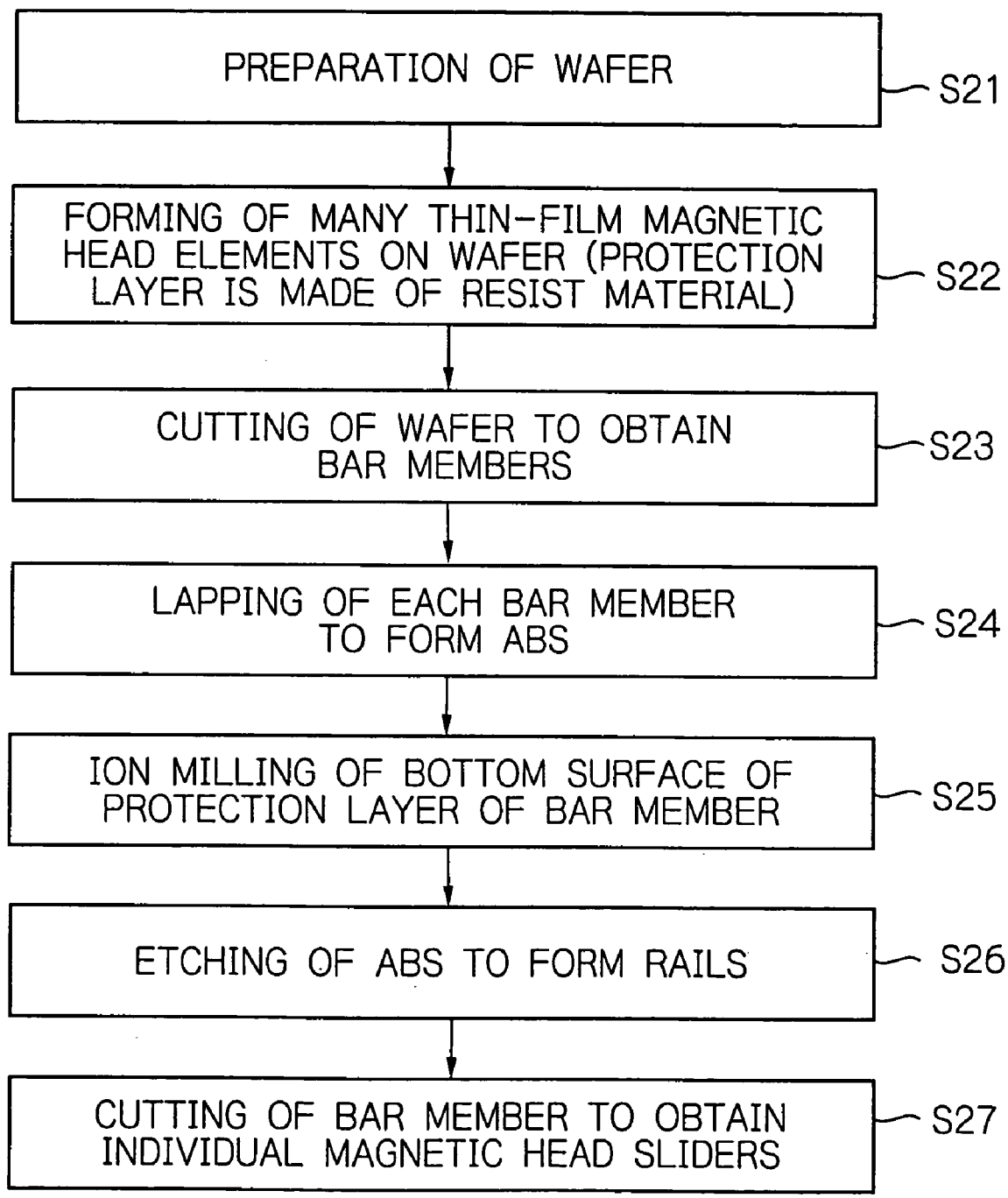
FIG. 6 is a flow chart illustrating a part of a manufacturing process of a magnetic head slider in further embodiment according to the present invention.

FIG. 6 illustrates a part of a manufacturing process of the magnetic head slider as further embodiment according to the present invention. In this embodiment, a thickness in at least partial area of a protection layer from an upper end edge of an upper magnetic pole to a corner edge between a bottom surface and a top surface of a bar member is determined in a range of 10-15 μm, and then etching is performed without executing chamfering and final lapping. Hereinafter, the manufacturing method of the magnetic head slider of this embodiment will be described using this drawing as reference.

First, a wafer or substrate made of $Al_2O_3$-TiC for example is prepared (Step S21).

Then, many thin-film magnetic head elements consisting of MR read head elements and inductive write head elements, many terminal electrodes for the respective thin-film magnetic head elements, and a protection layer are formed on the wafer by using a known thin-film integration technique (Step S22). Thus, a wafer with a thin-film surface layer of the magnetic head elements and the protection layer made of a resist material for over-coating the magnetic head elements is obtained. The thickness of the protection layer on the upper end edge of the upper magnetic pole is determined in a range of 10-15 μm.

Then, the wafer is cut to separate into a plurality of bar members each of which has a plurality of aligned magnetic head elements (Step S23).

Then, a bottom surface of each bar member, which surface will configure ABSs is lapped to adjust an MR height and to form the ABSs (Step S24).

Then, the bottom surface of the protection layer of each bar member is etched by dry etching or ion milling (Step S25). If the bottom surface is ion-milled, the corner edge of the protection layer will be rounded off or more shaved. In other words, by performing the ion milling, a corner edge portion with a curved cross sectional profile is formed. This causes the end edge of the bottom surface to be near to the upper magnetic pole of the inductive write head element, so as to back off the surface of the protection layer. Therefore, it is possible to reduce the amount of the thermal expansion protrusion of the protection layer toward the ABS due to write current during writing operations. Particularly, according to this method, because the end edge of the bottom surface is inherently rounded by merely performing the ion milling, the manufacturing process becomes quite easy. Also, since this method will induce no damage to the magnetic pole, the thermal expansion protrusion of the protection layer can be certainly reduced without deteriorating the characteristics of the magnetic head element.

Thereafter, the bottom surfaces of the plurality of bar members are etched by ion milling for example to form a rail pattern (Step S26).

Then, each bar member is cut to separate into individual magnetic head sliders (Step S27).

Many widely different embodiments of the present invention may be constructed without departing from the spirit and scope of the present invention. It should be understood that the present invention is not limited to the specific embodiments described in the specification, except as defined in the appended claims.

The invention claimed is:

1. A manufacturing method of a flying magnetic head slider comprising:
   providing a substrate with a plurality of inductive write head elements formed thereon, each head element including a pair of magnetic poles facing to each other via a magnetic gap, and with a protection layer covering said plurality of inductive write head elements;
   cutting said substrate to separate into a plurality of bar members, each of said bar members including aligned inductive write head elements;
   processing said protection layer of each bar member so that a distance from an end edge of said pair of magnetic poles to an edge of a bottom surface of the bar member becomes in a range of 1 to 15 µm;

lapping each bottom surface of said bar member; and cutting each bar member to separate into a plurality of individual magnetic head sliders.

2. The manufacturing method as claimed in claim 1, wherein said processing comprises chamfering a corner edge of said protection layer between a first end surface near which said inductive write head elements are formed and said bottom surface to form a chamfered section so that a distance from the end edge of said pair of magnetic poles to the edge of a bottom surface of the bar member becomes in a range of 1 to 15 µm.

3. The manufacturing method claimed in claim 2, further comprising configuring the magnetic head sliders to be installed in a disk drive such that the corner edge is a trailing edge perpendicular to a direction of rotation of a magnetic disk and parallel to the magnetic disk.

4. The manufacturing method claimed in claim 2, wherein the chamfering comprises chamfering the corner edge across an entire width of each magnetic head slider.

5. The manufacturing method claimed in claim 2, wherein the chamfering includes providing a rounded edge on the chamfered section.

6. The manufacturing method as claimed in claim 2, wherein said processing comprises chamfering said corner edge to form said chamfered section with an angle in a range of 20 to 70 degrees with respect to said bottom surface.

7. The manufacturing method as claimed in claim 1, wherein said processing step comprises etching said bottom surface so that a distance from the end edge of said pair of magnetic poles to the edge of a bottom surface of the bar member becomes in a range of 1 to 15 µm.

8. The manufacturing method as claimed in claim 1, wherein said lapping comprises lapping the bottom surface of said bar member using diamond abrasive grains.

9. The manufacturing method as claimed in claim 1, wherein said providing step comprises providing the substrate with a plurality of magnetoresistive effect read head elements, with the plurality of inductive write head elements, each inductive write head element having the pair of magnetic poles facing to each other via the magnetic gap, and with the protection layer covering said plurality of magnetoresistive effect read head elements and said plurality of inductive write head elements.

* * * * *